(12) United States Patent
Le Muet et al.

(10) Patent No.: US 11,261,839 B2
(45) Date of Patent: Mar. 1, 2022

(54) DEVICE FOR COLLECTING ENERGY FROM BROAD WAVE SPECTRA

(71) Applicants: Ivan Le Muet, Paris (FR); Sébastien Le Muet, Suresnes (FR)

(72) Inventors: Ivan Le Muet, Paris (FR); Sébastien Le Muet, Suresnes (FR)

(*) Notice: Subject to any disclaimer, the term of this patent is extended or adjusted under 35 U.S.C. 154(b) by 0 days.

(21) Appl. No.: 16/065,871

(22) PCT Filed: Dec. 24, 2015

(86) PCT No.: PCT/FR2015/053755
§ 371 (c)(1),
(2) Date: Jun. 25, 2018

(87) PCT Pub. No.: WO2017/109301
PCT Pub. Date: Jun. 29, 2017

(65) Prior Publication Data
US 2019/0010916 A1   Jan. 10, 2019

(51) Int. Cl.
*F03B 13/24* (2006.01)
*F03B 13/14* (2006.01)

(52) U.S. Cl.
CPC ............ *F03B 13/24* (2013.01); *F03B 13/142* (2013.01); *F05B 2220/706* (2013.01); *F05B 2240/95* (2013.01); *Y02E 10/30* (2013.01)

(58) Field of Classification Search
CPC .......... F05B 2220/706; F05B 2240/95; Y02E 10/32; Y02E 10/38; F03B 13/142; F03B 13/24

(Continued)

(56) References Cited

U.S. PATENT DOCUMENTS

| 960,478 A | * | 6/1910 | Allard | ................. F03B 13/24 |
| | | | | 417/100 |
| 4,466,244 A | * | 8/1984 | Wu | ................. F03B 13/142 |
| | | | | 417/100 |

(Continued)

FOREIGN PATENT DOCUMENTS

| EP | 2944801 A1 | 11/2015 |
| FR | 2959780 A1 | 11/2011 |

(Continued)

OTHER PUBLICATIONS

International Search Report of the International Searching Authority, along with an English translation, dated Sep. 9, 2016, issued in connection with International Application No. PCT/FR2015/053755 (5 pages).

(Continued)

*Primary Examiner* — Charles Reid, Jr.
(74) *Attorney, Agent, or Firm* — McCarter & English, LLP

(57) ABSTRACT

A device for collecting renewable energy includes two superposed caissons and the height of which is small in comparison with the expanse of the device which are floating or secured to a fixed or shoreline structure. A plurality of similar tubes with vertical axes is distributed over the expanse of the caissons, extending down beneath the caissons, open at their lower ends immersed in the water. Upper ends are inset into the caissons and have a valve that opens from the inside of the tube toward the upper caisson, and with a valve opening from the lower caisson toward the inside of the tube. Air is driven into the upper caisson by the rise in water level in some of the tube and conveyed through a turbine generator unit which produces electricity, then returns into the lower caisson suction into tubes in which the water level is falling.

10 Claims, 2 Drawing Sheets

(58) Field of Classification Search
USPC .................................................. 290/42, 53
See application file for complete search history.

(56) References Cited

U.S. PATENT DOCUMENTS

| | | | |
|---|---|---|---|
| 5,105,094 A * | 4/1992 | Parker | F03B 13/148 |
| | | | 290/53 |
| 6,140,712 A | 10/2000 | Fredriksson et al. | |
| 2004/0163387 A1 * | 8/2004 | Pineda | F03B 13/142 |
| | | | 60/495 |
| 2008/0191485 A1 | 8/2008 | Whittaker et al. | |
| 2010/0237623 A1 * | 9/2010 | Brown | E02B 9/08 |
| | | | 290/53 |

FOREIGN PATENT DOCUMENTS

| | | | |
|---|---|---|---|
| GB | 2429243 A | | 2/2007 |
| WO | 1996/000848 A1 | | 1/1996 |
| WO | 2011/061546 A2 | | 5/2011 |
| WO | WO-2014023401 A3 | * | 4/2014 |
| WO | 2015/102547 A1 | | 7/2015 |

OTHER PUBLICATIONS

Written Opinion of the International Searching Authority dated Sep. 9, 2016, issued in connection with International Application No. PCT/FR2015/053755 (6 pages).

* cited by examiner

DEVICE FOR COLLECTING ENERGY FROM BROAD WAVE SPECTRA

RELATED APPLICATIONS

This application is a U.S. National Phase Application under 35 U.S.C. 371 of International Application No. PCT/FR2015/053755 filed Dec. 24, 2015, the disclosure of which is expressly incorporated herein by reference in its entirety.

RELATED APPLICATIONS

This application is a U.S. National Phase Application under 35 U.S.C. 371 of International Application No. PCT/FR2015/053755 filed Dec. 24, 2015, the disclosure of which is expressly incorporated herein by reference in its entirety.

The present invention relates to a device allowing the collection of energy from the waves or swell, and more generally of any dynamic and local fluctuation of statistical order that animates the surface of any stretch of water having a large expanse exposed to the effects of bad weather.

The proposals allowing the collection of a part of the energy of the swell, for the purpose of converting it to electrical energy, have multiplied over the last twenty years.

The state of the art nowadays comprises five main families of such devices that convert a fraction of the energy of the swell to mechanical rotating energy, which allows the production of electrical current thanks to a generator. Each of these families has its limits and disadvantages.

Overflow devices exist, for example that of the patent document WO 1996/000848. These create a different in water level by making waves break over the walls of an enclosure, whose upper ridge is situated at a height substantially greater than that of the mean level of the stretch of water. The interposition of a turbine in the watercourse returning from the enclosure to the sea allows electricity to be produced thanks to this difference in water height. This simple device, without any moving mechanical part other than the turbine, nevertheless offers very modest levels of production in terms of the dimensional expanse and the investment it requires. In effect, only the spectral components of the swell have a height greater than the overflow height bringing a fraction of energy to the device. The components with low wavelengths, whose height is smaller, are not utilized. Too small an overflow height cannot be chosen, since it directly determines the potential collectable energy per admitted volume of water. Furthermore, the turbine for converting the potential energy of the water collected in this way to electricity is necessarily submerged and consequently has all the excess design, construction and maintenance costs attached to this submerged character.

Devices with floats exist that are attached to the bottom, for example, that of U.S. Pat. No. 6,140,712. These devices actuate hydraulic pump systems through the effect of the forces developed by the rise and fall of the floats, forces induced by the passing swell. These devices inevitably include complex mechanical parts, as well as hydraulic equipment necessarily submerged, which have high design, manufacturing and maintenance costs. On the other hand, their inertia does not allow them to collect the energy of the components of swell spectra having short wavelengths. Furthermore, their installation, as well as their dismantling, usually require substantial underwater work of a particularly high cost. A variant of this type of device consists in a surface-oscillating arm, at the end of which a semi-submerged float is disposed, and whose joint actuates a hydraulic jack when the height of the float varies under the effect of the swell. This device is installed on a structure secured to the bottom or to the shoreline, or on a highly stable floating platform. This variant only allows energy to be collected in the immediate vicinity of the support thereof, namely over a modest expanse.

Semi-submerged surface attenuators exist, for example, those of WO 2011/061546. These devices are made from a succession of floating members connected to each other by joints equipped with hydraulic jacks. These jacks allow energy to be collected by making a hydraulic fluid circulate with each relative movement of one element in relation to the other. The energy is then converted to mechanical rotating energy by a turbine disposed on the hydraulic circuit. These strings of jointed floating elements are usually anchored at one end, so that in the absence of current, they become freely oriented along the main direction of propagation of the swell. Their efficiency is maximum when they are exposed to a unidirectional swell, monochromatic and having a wavelength nearly twice the individual length of an element, and decreases significantly as soon as the wavelength of the swell differs from that value. Such devices are furthermore not very efficient in the case of combined or cross currents, and likewise if the main direction of the swell does not coincide with the direction of a potential local current, which then determines the orientation of the device independently of the direction of the swell. Furthermore, their construction and maintenance costs are high due on one hand to the fragility of the systems with joints and on the other that of the internal hydraulic equipment through which the collected energy transits before being converted to electricity.

Devices also exist with oscillating shutters, for example that described in US 2008/0191485. Such devices consist of shutters hinged on a base fastened to the bottom. Each shutter oscillates under the effect of the backwash induced by the swell. The movement of the shutter actuates hydraulic jacks, which set a fluid in motion, which in turn drives a turbine. A variant of this family of devices consists of oscillating shutters whose upper part comprises a float situated in the vicinity of the mean level of the stretch of water. This allows a combined collection of kinetic energy and potential energy, both relative to the swell wave. These devices, secured in the seabed, can only be installed in the immediate proximity of the shoreline, and on sites with shallow depths. They are only efficient in a swell of a fixed wavelength, of direction perpendicular to the axis of rotation of the shutters, and of period attuned to their own oscillation mode. Their efficiency diminishes very significantly as soon as the swell spectrum departs from this ideal configuration or in the event of crossing swells.

Devices also exist with oscillating columns of water, or with pistons, for example that of GB 2 429 243. Such a device collects energy, not by actuating an intermediate hydraulic system, but from the airflow driven or drawn in by a column of water animated by the swell. Some devices are based on cylinders in which moving pistons separate the water from the air. Other devices of this type consist of a cavity arranged on a shoreline exposed to the swell, whose lower part, permanently submerged and freely open, allows the water to flow into the cavity with each wave. The air in the cavity is then driven through a Wells type of alternating flow turbine, which allows collection in the form of electrical energy of a fluid passing alternately in one direction or another. In effect, when the wave withdraws, the water falls back in the column, generating a suction of the atmospheric air, which passes in the reverse direction in the turbine. This type of device can only be installed on a shoreline whose topography is suitable. Such shorelines are rare. Furthermore, the alternating airflow imposes the use of a Wells type of alternating flow air turbine, whose output is significantly less than the output of a turbine with a unidirectional and regular flow.

A variant of this device consists of a line of bottomless caissons incorporated to a fixed or floating sculpture. The bases of the caissons are submerged, while the upper part of each caisson communicates with two lateral air collectors equipped with valves. The opening direction of the valves is such that the air pushed by the water which rises in a caisson as a wave passes is driven into one of the collectors, while another symmetrical collector supplies air to the caissons whose water levels falls. An air turbine is installed on a tube connecting the two collectors at the end of the line of caissons, thus animated by a unidirectional airflow. These devices do not allow the collection of energy from the components of the swell whose wavelength is shorter than or close to the length of each caisson. They only allow an efficient collection of energy for spectral components of the swell that are oriented in the same direction as the line of caissons.

Among the water column devices, FR 2 959 780 describes a device for collecting energy from the waves. This device includes a hollow structure intended to be held above the surface of the water, with an internal volume of this structure that communicates with a turbine generator unit. The structure is associated with a series of screens of aligned tubes, open at their lower ends, which are immersed in the water. Each tube has a first unidirectional valve that opens from the inside of the tube towards the internal volume, and a second unidirectional valve that opens from outside the device towards the inside of the tube so as to form a device for collecting energy that functions as oscillating columns of water.

The applicant is committed to improving these types of device.

According to what is proposed:
a hollow structure comprises a lower caisson and an upper caisson, superposed, flat, compact, substantially distortion-free, closed and filled with a gas,
a plurality of tubes equipped with two valves in their upper part and pass through the lower caisson and terminate in the upper caisson, and
the turbine generator unit is assembled in a passage that interconnects the two caissons.

In operation, the first valve allows the gas that is above the water to be driven towards the upper caisson due to the rise in water level in some of the tubes under the effect of a wave; the gas thus driven passes through the turbine generator unit, then returns downstream into the lower caisson to be admitted by suction into tubes in which the water level is falling.

Other characteristics, details and advantages of the invention will emerge on reading the detailed description below, and the attached drawings, on which:

The drawings and the description below contain, in the main, elements of sure character. They will be able, not just to be used to make the present invention better understood, but also to contribute to its definition if need be.

The term "flat" caissons means in particular caissons having a small height in comparison with the horizontal dimensions such as the width and length of the device. The term "compact" caissons means in particular a set of caissons having a width of the same order of magnitude as their length. In horizontal section, the caissons can have a discoidal or square or ellipsoidal shape in contrast to the "dyke" or "aircraft carrier" style, the elongated shapes inevitably being optimized in relation to a specific direction of the wave, whereas the invention strives to harness a wider spectrum of swells (in directions and frequencies, including "multiple" or "standing" swells). However, it could be otherwise if the device is called upon to navigate.

These proposals improve the known devices with oscillating water columns so as to make them more efficient in varied conditions of swell, in particular as a function of its wavelengths and the spatial orientation of its spectral components.

From another viewpoint, the device according to the invention comprises a network consisting of a large number of similar tubes, distributed over a surface of little elongation, namely of width of the same order of magnitude as the length, therefore forming a volume that in this case is called "compact". The tubes can extend substantially parallel to each other and perpendicular to their distribution surface. They can be identical or of variable diameters while remaining substantially identical, at least statistically, that is to say that there is a range of diameters, shared around a mean or nominal value. The lower part of each tube is open and is immersed in the water, and the upper part is embedded in a structure formed from two superposed caissons of little height.

Figure 1:
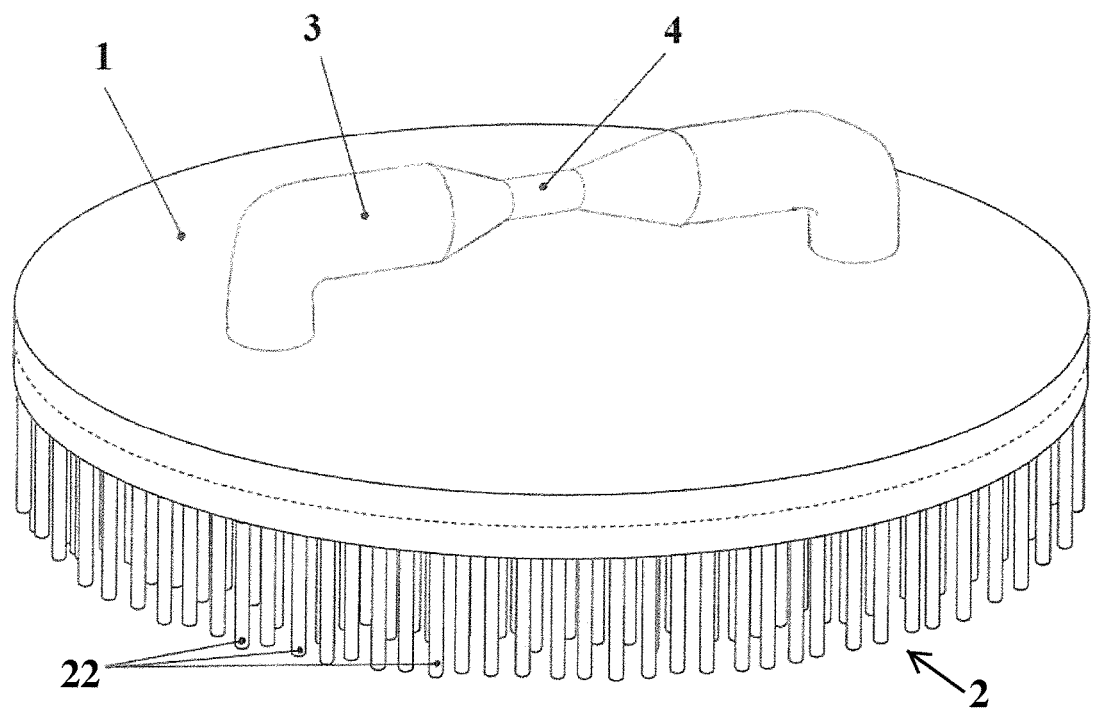
FIG. 1 shows an embodiment example of a device according to the invention.
Figure 2:
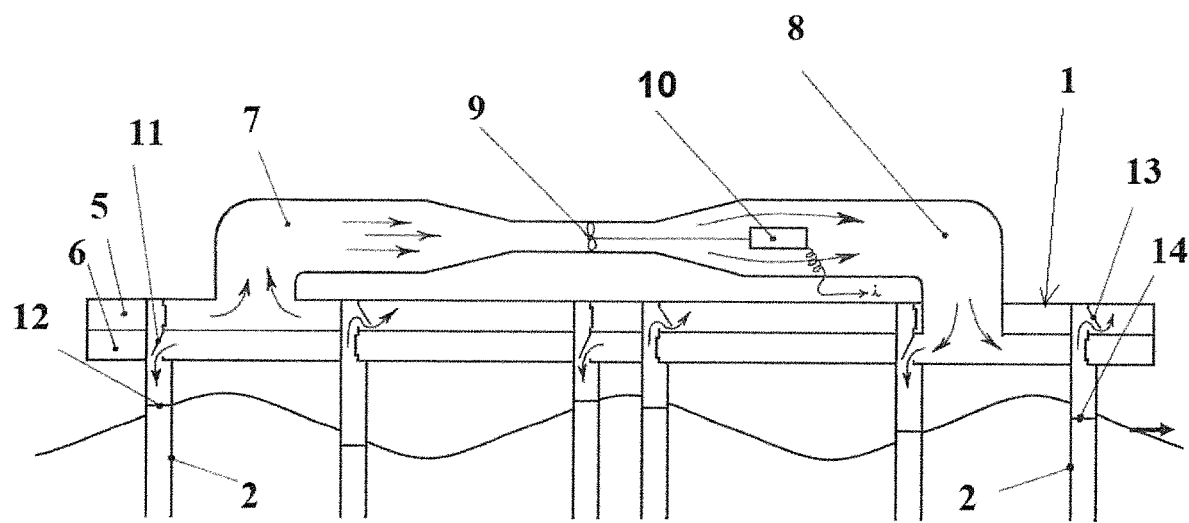
FIG. 2 shows a sectional view of the device of FIG. 1.
Figure 3:
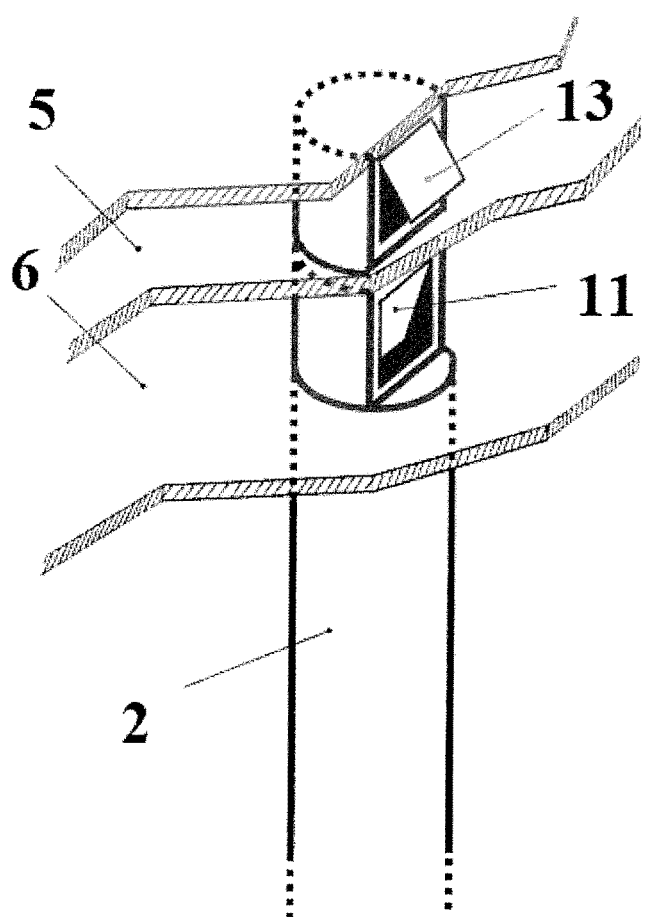
FIG. 3 shows an exploded view of a detail of the invention.

Reference is now made to FIGS. 1 to 3. An embodiment of the device according to the invention comprises a hollow structure 1 and hollow tubes 2. The hollow structure 1 includes an upper caisson 5 and a lower caisson 6.

The upper part of each tube 2 includes at least two unidirectional valves:
a first admission valve 13, in this case an upper flapper valve, which allows the air pushed back by the rising wave front to be driven into a first caisson, in this case the upper caisson 5, and
a second discharge valve 11, in this case a lower flapper valve, allowing the air of the second caisson, in this case the caisson 6 to be admitted into the tube 2 when the water level locally surrounding the tube 2 falls.

The admission and discharge valves 11, 13 are arranged so as to open under the effect of slight pressure differences, and to allow the greatest possible flow rates. They are moreover chosen so that the pressure loss values are similar on admission and on discharge.

The two caissons 5, 6 are connected to each other by a passage in which a turbine generator unit 9, 10 is assembled. The turbine generator unit 9, 10 comprises a conventional air turbine 9, intended always to turn in the same direction, and which drives a current generator 10 allowing the collection of energy.

In the example of FIGS. 1 and 2, the device is a floating version. The hollow structure 1 presents a circular expanse and thus forms a floating platform. The structure 1 in this case has a diameter of approximately 100 meters with a height between an upper side and a lower side of approximately 5 meters.

The passage in which the turbine generator unit 9, 10 is assembled takes the shape of a pipe 3 formed as an upturned "U", constructed as a superstructure and assembled on the upper caisson 5. As shown in the right hand part of FIG. 2, the portion of the pipe 3 downstream of the turbine generator unit 9, 10 passes through, and in a sealed manner, the upper caisson 5 to open into the lower caisson 6. The pipe 3 includes a working portion 4, with a reduced cross section compared with the rest of the pipe 5, in which working portion the air turbine is installed.

The upper parts of the tubes 2 are embedded in the hollow structure 1. They pass through the lower caisson 6 to the upper caisson 5. In the example described here, the device comprises a forest of 2,500 to 3,000 tubes 2, of an individual diameter of approximately 1.2 meters and having lengths of approximately 11 meters from the lower side of the lower caisson 6 to their lower submerged end, added to which is at least the height of the lower caisson 6, in this case approximately 2.5 meters. The grid of the network of tubes 2 is not strictly regular. The efficiency of the device is ensured, including with an installation of tubes 2 randomly distributed over the expanse of the structure 1, provided that the density of tubes 2 remains of the same order over the whole surface.

FIG. 3 shows the detail of an upper part of one of the tubes 2, part where it is embedded through the upper caisson 5 and the lower caisson 6. The tube 2 has a truncated section allowing a flat face to be obtained. This flat face is equipped with the two unidirectional valves for admission 13 and discharge 11. The discharge valve 11 opens from the lower caisson 6 towards the inside of the tube 2 when the water level in the tube 2 falls, while the admission valve 13 opens from the inside of the tube 2 towards the upper caisson 5 when the water level rises in the tube 2.

Some tubes 22 at the periphery of the structure 1 are similar to the hollow tubes 2 and are furthermore obstructed close to their lower end, in a sealed manner, and in order to trap gas inside. These obstructed tubes thus form floats.

The device according to this embodiment is anchored to the seabed by anchoring lines via attachments that are not illustrated. The floating level of the device is adjusted by adopting the appropriate number and volume of peripheral floats and/or by injecting a neutral gas or compressed air into the caissons 5, 6, such that the mean level of the sea is situated approximately at mid-height of the protruding length of the tubes 2. A kit for injecting pressurized gas and for gas purging can be provided so as to maintain pressure in a controlled manner in order to adjust the floating height. This kit functions in a way similar to that implemented in submarines to adjust their submersion depth. It comprises, for example, ballasts from which water can be driven by injecting compressed air.

On FIG. 2, the movements are illustrated by arrows. At the lower right, an arrow indicates the orientation of the progression of the waves or swell wave, namely from left to right. The right hand portion of each wave on FIG. 2 thus constitutes a wave front. The corresponding free water surface 14 in a first set of tubes 2 is in rising phase. In contrast, the left hand portion of each wave on FIG. 2 constitutes a back of a wave. The corresponding free water surface 12 in a second set of tubes 2 is in falling phase. The installation can be exposed to any swell spectrum, and standing waves in particular.

The free water surface 14 rising inside the tube 2 drives the air through the first admission valve 13, thus supplying the upper caisson 5. The upper caisson 5 thus presents a continuous overpressure in view of the large number of tubes 2. Statistically and thanks to a substantially homogeneous distribution of the tubes 2 over the expanse of the structure 1, approximately half of the tubes 2 sees the free water surface 14 rise, while the other half of the tubes 2 sees the free water surface 12 fall at every moment. The overpressure in the caisson 5 is thus furthermore substantially constant.

The free water surface 12 falling inside the tube 2 draws in air from the lower caisson 6 through the second discharge valve 11. The lower caisson 6 thus presents a continuous low pressure, substantially constant and strictly lower than the pressure inside the upper caisson 5.

The overall airflow thus formed and illustrated by several arrows on FIG. 2, flows from the tubes 2 in which the free water surface 14 rises, passes through the first admission valves 13 into the upper caisson 5, passes through an upstream collector portion 7 of the pipe 3, passes along the working portion 4 while actuating the turbine 9, is collected by a downstream collector portion 8 of the pipe 3, is driven into the lower caisson 6, and is drawn into other tubes 2 in which the free water surface 12 is falling while passing though the second discharge valves 11.

The pressure differences ensure that the air circulates. However, the mean, or static value of the pressures in the caissons 5, 6 relative to the atmospheric pressure can be adapted so as to adjust the floatability of the structure 1, that is to say the position of its waterline. For example, the difference between the low pressure in the lower caisson 6 and the atmospheric pressure can be substantially equal to the difference between the overpressure in the caisson 5 and the atmospheric pressure. In this case, the floatability of the structure 1 is essentially ensured by floats. In another example, the mean pressure in the whole of the structure 1 is kept higher than the atmospheric pressure. The structure 1 is overpressurized. In this case, the overpressure contributes significantly to the buoyancy. The structure 1 can then be without floats.

The floatability of the device is ensured at least in part by the presence of gas, air in this case, trapped in the tubes 2 and the two caissons 5, 6, the air circulating in closed circuit between the caissons 5, 6 and the pipe 3 the tubes of the network. The stability of the device, its resistance to tilting, is improved by endowing the periphery of the structure 1 with floats having a shape not too disturbing for the swell, for example by blocking some periphery tubes by obstructing their ends as described previously or by adding other types of float.

As a variant, the arrangement of the upper caisson 5 and of the lower caisson 6 are reversed such that the upper caisson 5 is downstream of the turbine generator unit 9, 10, while the lower caisson 6 is upstream. The direction of opening of the valves 11, 13 is then reversed.

As a variant, the turbine 9 and/or the generator 10 are disposed in the portion forming upstream collector 7 or in the portion forming downstream collector 8, for example by means of spacers supporting them. The turbine 9 drives the generator 10 through a horizontal rigid shaft. In another variant, the turbine 9 is disposed substantially at the interface of the two caissons 5, 6, for example in a cutout made in a panel separating the two caissons 5, 6 and such that the axis of rotation of the turbine is substantially vertical in a zone without tubes 2. This disposition makes it possible to reduce the windage of the structure and to simplify the maintenance of the generator 10, which is then installed on the upper caisson 5 and driven by the turbine 9 wheel via the vertical shaft.

The dimensions of the main components of the device can be selected in relation to the swell spectrum of the chosen place of installation. The device allows the collection of energy for all the swell components whose wavelength is included between approximately twice the diameter adopted for the tubes 2, and the general external dimension of the platform formed by the device. The diameter, or the mean, or nominal diameter as the case may be, of the tubes 2 is therefore chosen by considering the swell spectrum of the site where the device will be installed. The diameter is preferably of the order of half the shortest wavelength significantly present in the spectrum. The number of tubes 2, typically several hundreds, even several thousands, is defined such that the area in horizontal section of all of the tubes 2 does not exceed half the surface area of the expanse of the device.

In the example of FIGS. 1 and 2, the device is designed to form an autonomous floating platform. As a variant, the device forms a fixed platform secured to the shoreline or to the seabed, while forming for example a jetty. It can also constitute an extension platform intended to be attached to a floating machine so as to supply the latter with electricity. The fixed devices according to the invention can be installed on sites of significant tidal range, in which case they produce energy during a part of the tidal range, namely for as long as the lower ends of the tubes 2 are immersed in the water.

In the case where the device forms an autonomous floating platform, this can be moored by an anchoring system, close to the coastline, nevertheless avoiding surf zones, or at a site more distant from the coastline.

Alternatively to an anchoring, the floating platform can be held at a fixed location by a mechanism allowing it to slide vertically along a central mast secured to the bottom and passing through the structure 1 and/or along several peripheral pillars. In these cases, the tilting stability is also ensured by the mechanical guiding of the structure 1 along the pillars secured to the bottom.

The electricity produced by the generator 10 is conveyed to land by a submarine cable to be discharged into a network, or it can be self-consumed by the floating machine to which the device is coupled, for example a drilling platform or a vessel.

The tubes 2 of the network can be manufactured from not very costly materials, or from tubes already currently mass-produced, for example, in steel, cast iron, composite materials, plastic materials or reinforced concrete.

The caissons 5, 6 can be manufactured from not very costly materials such as steel, certain composite materials or reinforced concrete.

In the case of a floating version of the device, the internal air circulating in closed circuit can be replaced by nitrogen or a gaseous mixture depleted of active oxygen, such that corrosion and the development of living organisms are prevented in the internal parts of the device.

In the case of a fixed version of the device secured to the shoreline, the swell wavelengths that are longer than the main dimension of the platform are susceptible of creating overpressure or low pressure of the assembly of the two caissons 5, 6, since almost all of the network of tubes 2 is then solicited in phase. In order to continue energy production, including in these situations, the lower caisson 6 of the device can be equipped with a high flow discharge valve calibrated for an opening pressure corresponding to a height of water of the order of half the free length of the tubes 2 below the caissons 5, 6. The upper caisson 5 can in turn be equipped with a high flow valve for admitting outside air, calibrated for a low pressure equivalent to this same height of water. These valves only open in the event of overpressure or low pressure caused by a phased rise or fall of the water in a majority of tubes.

In the case of a floating version of the device exposed to swell wavelengths longer than the dimensions of the platform, the latter follows the average movements of the surface of the water and the risks of overpressure or depressurization of the caissons 5, 6 due to phased rise or fall of the water in the network of tubes 2 as a whole are non-existent.

The device can be constructed by assembling several modules, in particular by juxtaposition.

Figure 4:
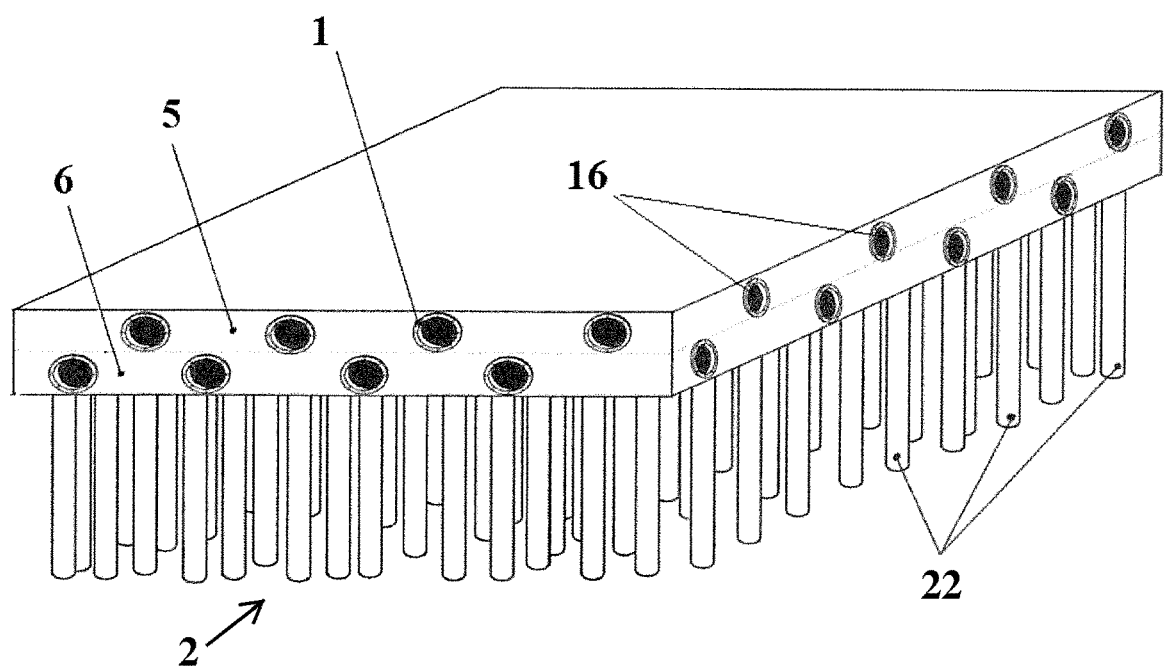
FIG. 4 shows an embodiment example of a module of a device according to the invention.

Reference is now made to FIG. 4 illustrating a module for assembly by juxtaposition. A main module, preferably with a polygonal expanse, comprises in particular the turbine generator unit 9, 10. Extension modules having edges or lateral faces corresponding to those of the main module are assembled to it. Such an extension module is illustrated in FIG. 4, in this case with a square shape. The extension module can be without a turbine generator unit 9, 10.

The modules are secured together at their sides. Each module comprises openings 16 arranged in the lateral faces so as to be opposite corresponding openings in the neighboring module. The openings 16 allow fluidic communication on one hand between all of the upper caissons 5 and on the other between all of the lower caissons 6 in the assembled state of the device.

In the example described here, the openings 16 are equipped with sealing flanges. The function of these connections is to convey airflows allowing the device to function.

A device made from several modules assembled to each other allows construction in kit form in workshops of limited dimensions for assembly near the operating site, or on the actual site. Transport and conveying to the assembly site is thus simplified. Such a design as kits of modules for assembly also allows series production of the modules, at the same time allowing the shape and extent of the device assembled on site to be adapted according to the circumstances.

The peripheral sealing of the device in the assembled state is obtained by closing in a sealed manner the unused peripheral openings 16, in this case with bolted sealing plugs.

A device according to the invention has the following advantages compared with previously known devices:

- It allows energy to be collected over a broad swell spectrum, both in terms of wavelength and in terms of orientations. In particular, it authorizes an efficient collection of energy in situations of combined, crossing or standing, choppy swell or in the case of different orientation of the swell in relation to a potential local marine current.
- It intrinsically comprises its own ability to float, thanks to the gas from its energy collection circuit. The presence of peripheral floats improves the dynamic righting stability with regard to heel in the absence of guidance. When it is guided vertically along secured pillars, the floats are superfluous.
- The construction cost of the device is low because it can be constructed from existing mass production products, in particular for the tubes. Furthermore, it is without any moving part working in submersion.

The device is intrinsically highly robust and very reliable, due to its simplicity, and the fact that it only includes passive moving mechanical components, consisting of the valves, which work in the aerial part of the installation. The device functions without any system of pistons or jacks.

The maintenance costs of the device are low, its turbine generator unit being on the surface and therefore easily accessible.

The device, in particular when it is floating, has excellent resistance to bad weather and storms thanks to its low windage and to its intrinsic floatability.

The device can be constructed in modular fashion, each module having dimensions such that they allow easier construction, lifting and conveying than a device made in one piece. This construction method furthermore allows, by adding modules, the power of an existing installation to be increased with a lower additional investment. Such a modular construction can be customized at will.

When the gas circuit is closed, a gas or a mixture without oxygen can be implemented in lieu and in place of the air, which limits phenomena of internal corrosion and invasion by marine plant or animal organisms.

The invention is not limited, either to the examples of devices described above, only as examples, or to the various combinations of variants, but it encompasses all of the variants the person skilled in the art may envisage within the framework of the claims that follow.

The invention claimed is:

1. A device for collecting energy from waves, comprising:
    a hollow structure positioned above the surface of a stretch of water, an internal volume of the structure communicating with a turbine generator unit, the structure being associated with a plurality of hollow tubes, open at a lower end of the hollow tubes, which are immersed in the water, each tube having a first unidirectional valve with a flapper that opens from the inside of the tube towards the internal volume, and a second unidirectional valve with a flapper that opens from downstream of the turbine generator unit towards the inside of the tube to form a loop for collecting energy from oscillating columns of water, interacting with the turbine generator unit;
    a lower caisson and an upper caisson, the caissons superposed, flat and having small heights in comparison to the widths and lengths, closed and filled with a gas, the tubes pass through the lower caisson and terminate in the upper caisson, and the turbine generator unit is assembled in a passage that interconnects the two caissons,
    the first unidirectional valve of each tube allowing the gas that is above the water to be driven from the tube towards the upper caisson due to a rise in water level in some of the tubes under the effect of a wave, the gas passing through the turbine generator unit, then returning downstream into the lower caisson to be admitted by suction into tubes in which the water level is falling,
    wherein the loop of the device is closed and the gas is depleted of oxygen.

2. The device as claimed in claim 1, furthermore comprising flotation components for ensuring that the structure is held above the surface of the water.

3. The device as claimed in claim 2, wherein the flotation components comprise semi-submerged floats disposed at a lower periphery of the structure, such that a mean level of the surface of the water is situated approximately at mid-height of the part of the tubes that protrudes below the lower caisson.

4. The device as claimed in claim 3, wherein at least some of the plurality of hollow tubes are obstructed at one end of the tubes to form at least some of the tubes into floats.

5. The device as claimed in claim 1, wherein the gas essentially consists of nitrogen.

6. The device as claimed in claim 1, wherein the structure is arranged so as to be held substantially immobile relative to the seabed and/or to the shoreline.

7. The device as claimed in claim 1, wherein the passage interconnecting the two caissons is formed by two portions of pipe between which the turbine generator unit is interposed.

8. The device as claimed in claim 1, further comprising an assembly of upper caissons and lower caissons, the upper caissons being in fluidic communication with each other, the lower caissons being in fluidic communication with each other, the turbine generator unit being common to all of the caissons of the assembly.

9. The device as claimed in claim 1, wherein the plurality of hollow tubes are arranged about the structure to harness a broad spectrum of swells.

10. The device as claimed in claim 9, wherein the plurality of hollow tubes comprises 2,500 to 3,000 tubes.

* * * * *